March 10, 1942.    P. HOLCOMB, JR    2,275,436
TELEGRAPH SYSTEM AND APPARATUS THEREFOR
Filed July 8, 1939    7 Sheets-Sheet 1

INVENTOR
P. HOLCOMB JR.
BY M. R. Marsh
ATTORNEY

March 10, 1942.  P. HOLCOMB, JR  2,275,436
TELEGRAPH SYSTEM AND APPARATUS THEREFOR
Filed July 8, 1939  7 Sheets-Sheet 2
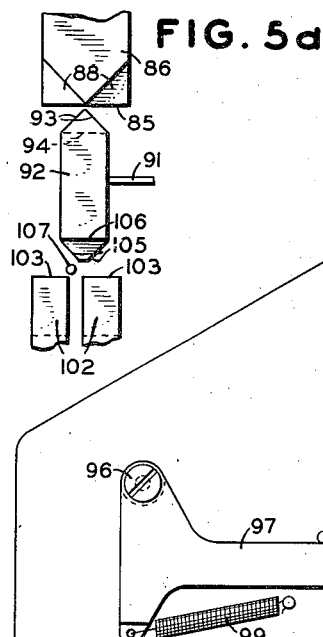
FIG. 5a
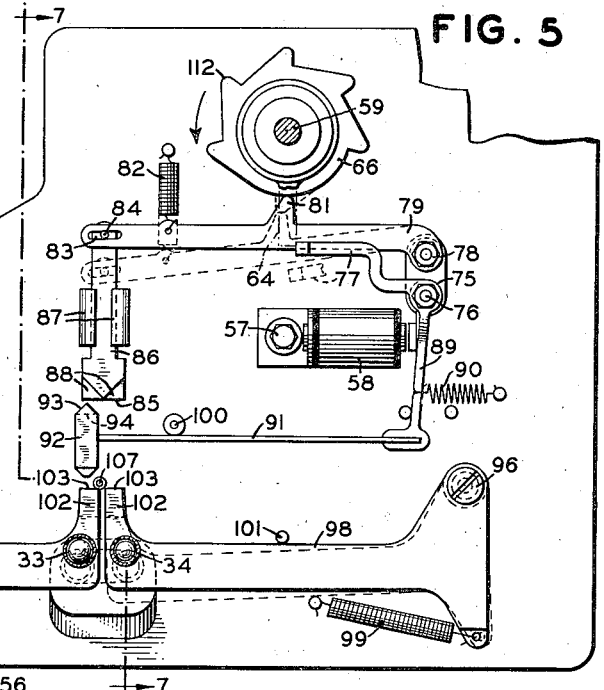
FIG. 5
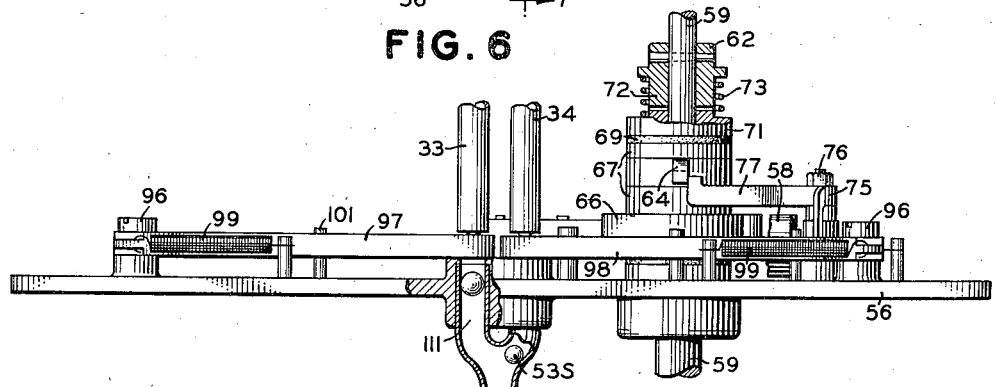
FIG. 6
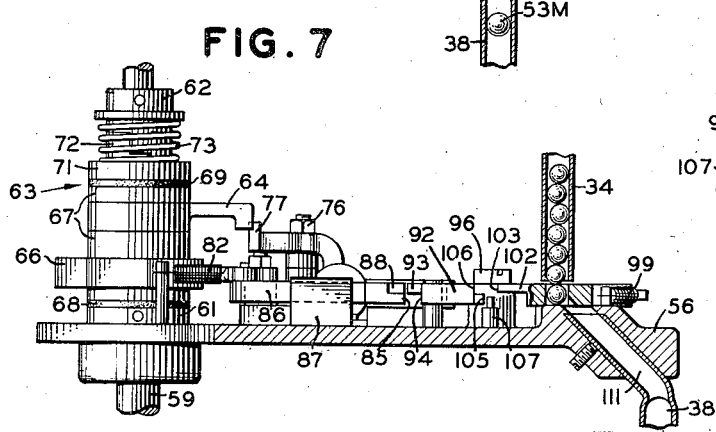
FIG. 7
FIG. 8
INVENTOR
P. HOLCOMB JR.
BY M. R. Marsh
ATTORNEY March 10, 1942.  P. HOLCOMB, JR  2,275,436
TELEGRAPH SYSTEM AND APPARATUS THEREFOR
Filed July 8, 1939   7 Sheets-Sheet 3
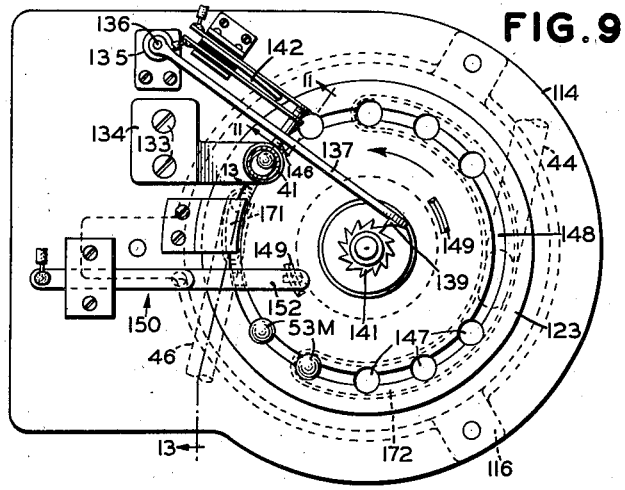
FIG. 9
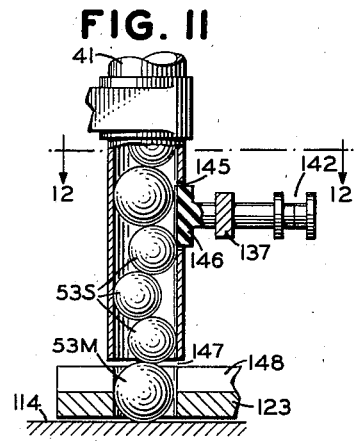
FIG. 11
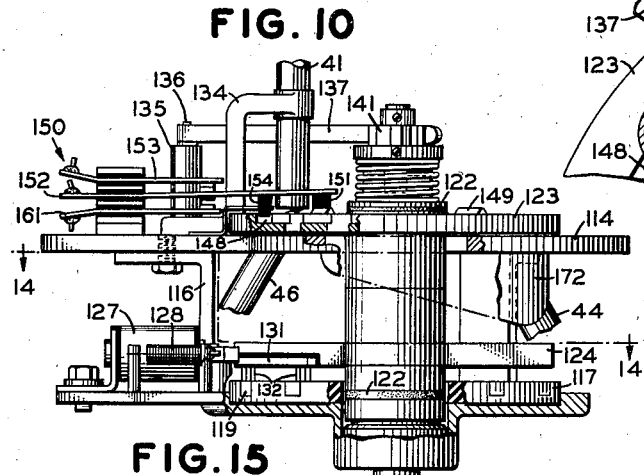
FIG. 10
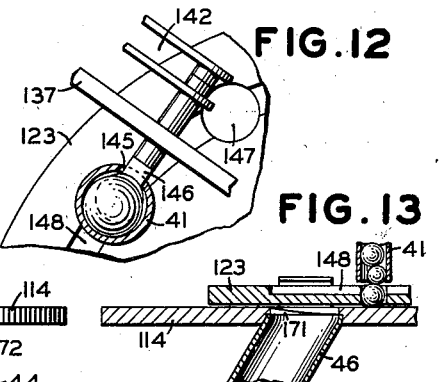
FIG. 12
FIG. 13
FIG. 14
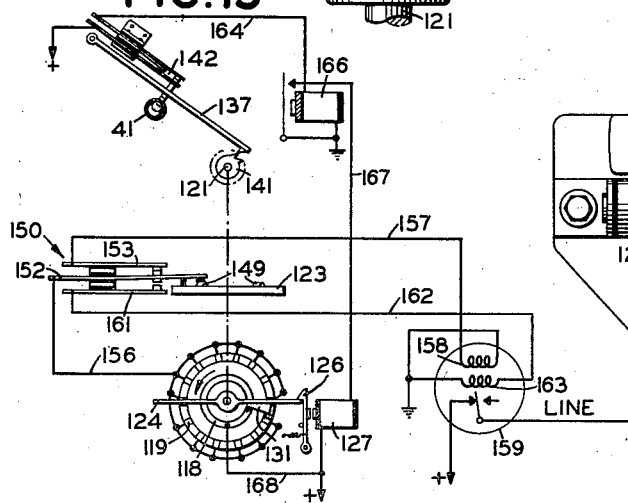
FIG. 15
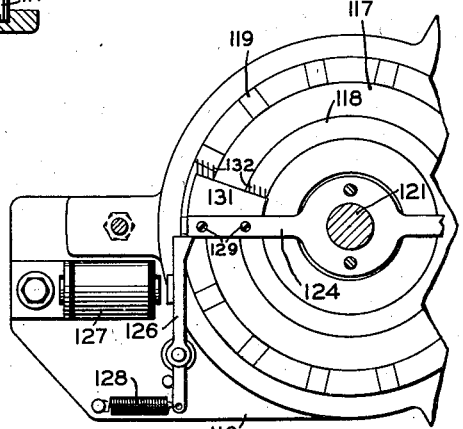
INVENTOR
P. HOLCOMB JR.
BY M. R. Marsh
ATTORNEY March 10, 1942.   P. HOLCOMB, JR   2,275,436
TELEGRAPH SYSTEM AND APPARATUS THEREFOR
Filed July 8, 1939    7 Sheets-Sheet 5

INVENTOR
P. HOLCOMB JR.
BY M. R. Marsh
ATTORNEY

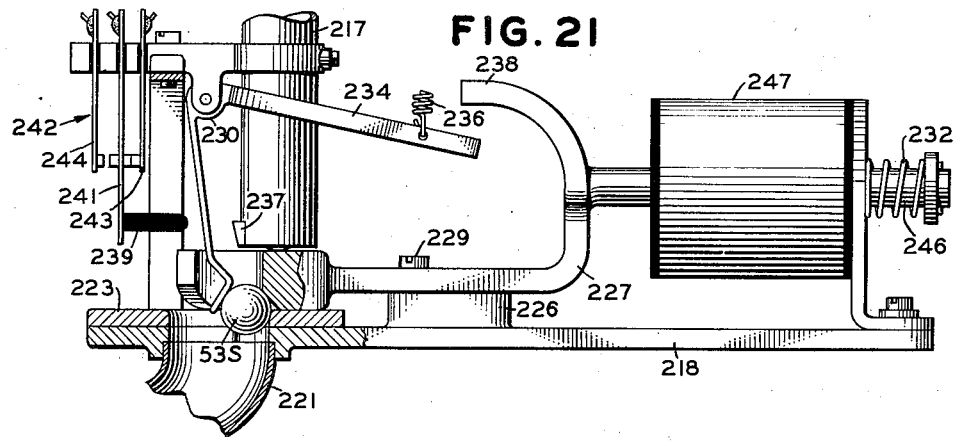
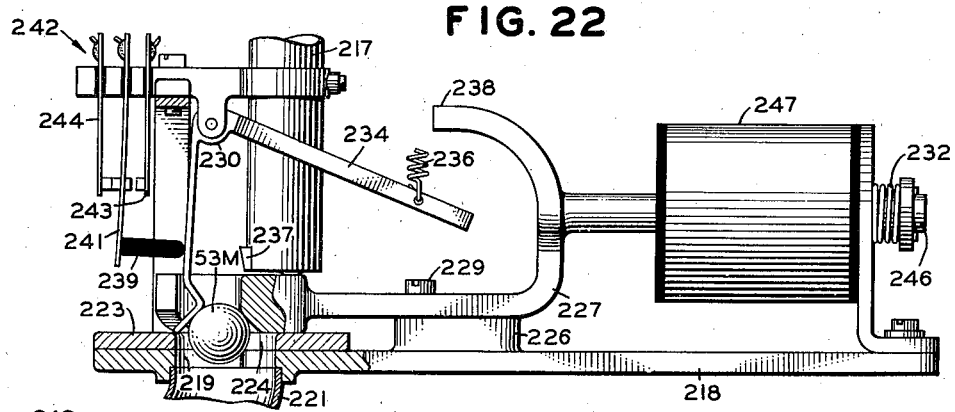
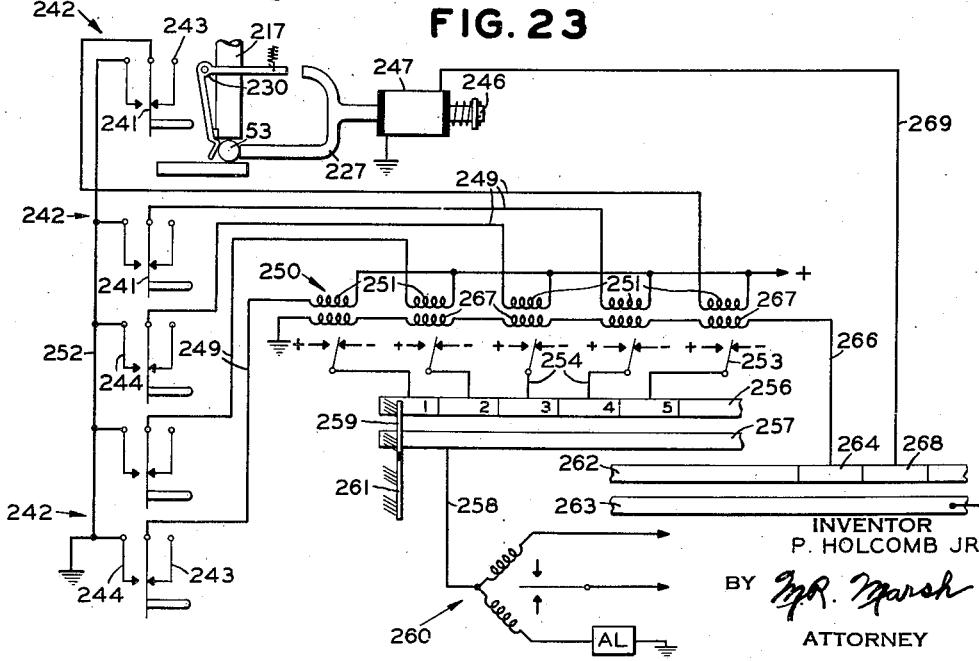

March 10, 1942. P. HOLCOMB, JR 2,275,436
TELEGRAPH SYSTEM AND APPARATUS THEREFOR
Filed July 8, 1939 7 Sheets-Sheet 7
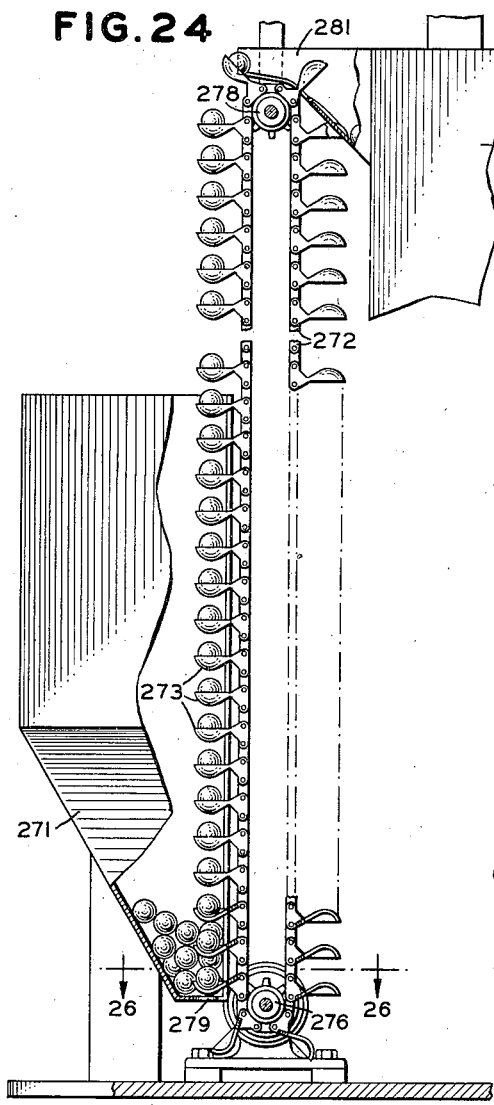
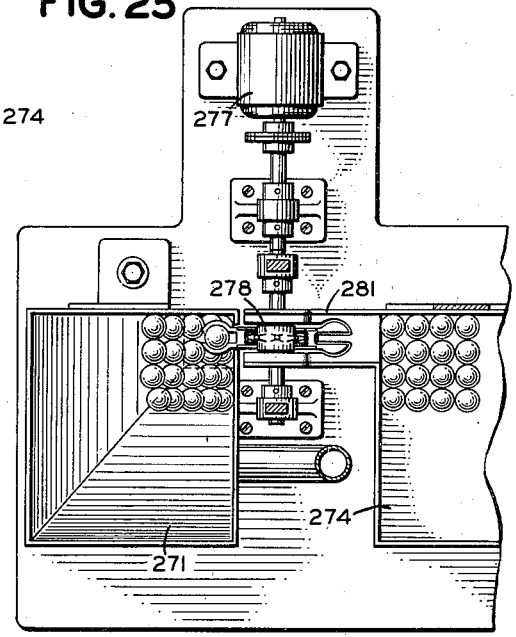
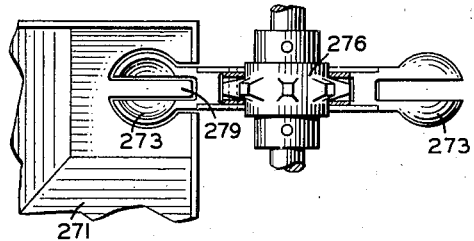
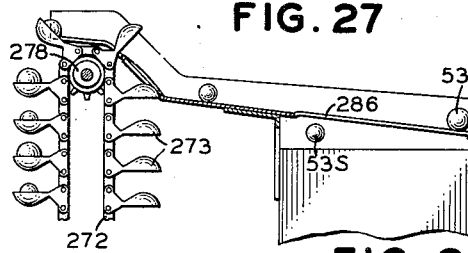
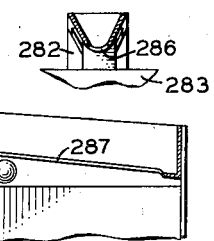
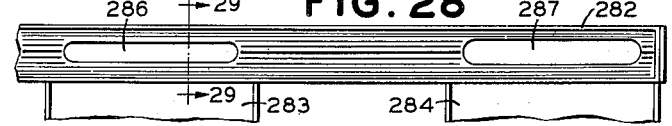
INVENTOR
P. HOLCOMB JR.
BY M. R. Marsh
ATTORNEY Patented Mar. 10, 1942

2,275,436

UNITED STATES PATENT OFFICE 2,275,436

TELEGRAPH SYSTEM AND APPARATUS THEREFOR

Philo Holcomb, Jr., Great Neck, N. Y., assignor to The Western Union Telegraph Company, New York, N. Y., a corporation of New York Application July 8, 1939, Serial No. 283,334

29 Claims. (Cl. 178—17.5)

This invention relates primarily to telegraph systems and apparatus therefor and more particularly to a telegraph system and the apparatus employed in a novel manner and arrangement such as for relaying telegraph messages through a central telegraph office where for obvious reasons, such as differences in speeds of operation between incoming and outgoing channels, changing from one code to another, number of circuits available, etc. no direct electrical connection exists or can be conveniently or readily established between incoming and outgoing channels of communication. Under such circumstances the telegraph messages are received simultaneously or spasmodically over one or a number of incoming channels, stored for the time being, routed to and then retransmitted over the proper outgoing channel.

One of the present methods employed in relaying messages through a central office, such as those originating in a branch office, is to receive the messages at the central office on a printer or reperforator in a receiving position and then manually and/or mechanically convey the entire message blank or perforated tape to the proper sending position where, in case the message is in a printed form it is manually retransmitted and in the case of a reperforated message it is fed through a tape transmitter. Obviously in this method retransmission of the message is delayed until the entire message is received and the message is further delayed by the time it takes to convey it to the sending position. Where messages are thus relayed one or more times before they finally reach their destination an appreciable length of time may elapse and in addition a considerable amount of paper and labor may be required.

Another method of relaying messages through a central station is by what is known in the art as "reperforator switching" wherein messages are received at a central station on a reperforator which reperforates and stores the message in a tape, the tape then being fed through a tape transmitter which transmits the message usually at a high rate of speed across the office to a second reperforator adjacent the proper sending position. The tape from the second reperforator is then fed through a tape transmitter associated with the proper outgoing channel. Obviously this system, while not having some of the delays and disadvantages inherent in the first system, requires a considerable amount of apparatus and reperforating tape for its operation.

In view of the above, one of the primary objects of the invention resides in the provision of a novel telegraph system and apparatus therefor which is particularly adaptable for use, generally stated, in transmitting, relaying, distributing, receiving, storing and retransmitting messages at a telegraph office.

Another object of the invention resides in the provision of apparatus for converting received telegraph signals into portable mechanical elements possessing various physical and electrical characteristics, such as small balls of different sizes which, according to these differences, represent the different impulses composing received telegraph signals.

Another object of the invention is to provide apparatus for arranging small mechanical elements of different sizes such as balls in one or more files or lines in accordance with received telegraph signals, such elements while so arranged being easily stored and kept in the order in which they are arranged.

Another object of the invention is to provide means for easily and quickly conveying the mechanical elements representative of received telegraph signals from one place, such as a receiving position to another such as a sending position while at the same time maintaining their proper arrangement.

Another object of the invention is the provision of apparatus for reconverting one or more lines or files or small mechanical elements, such as balls arranged according to telegraph signals back into the telegraph signals.

Another object of the invention is to employ mechanical elements which may be reused time and time again.

Another object of the invention is to provide a signal storage system wherein single or small groups of characters may be retransmitted without the necessity of special or complicated mechanisms.

Another object of the invention is the provision of apparatus of the above nature comprising a minimum number of inexpensive and easily manufactured parts and operable at a high rate of speed.

Another object of the invention is the provision of apparatus of the above nature which may be operated in conjunction with communication signals of any of the well known intermittent, polar or increment types, such as Morse, teleprinter, multiplex, multi-element cable code etc.

These and other objects of the invention will be more apparent in the following detailed description:

In the preferred embodiment of the invention the mechanical elements employed are steel balls similar to the type used in ball bearings and are of two sizes, one size slightly larger than the other, while both sizes are the smallest that can be used consistently with reliable selection and retransmission. The small and large balls are hereinafter referred to as spacing and marking balls, respectively. Each size ball has a separate supply hopper or reservoir where they are stored prior to their use and extending from each hopper are supply tubes or chutes which convey the balls to a selector. The selector operates in response to received signals and in one embodiment arranged the marking and spacing balls in single file in a single storage tube one behind the other in accordance with the sequence in which the signals are received. The first storage tube preferably leads to a distributor mechanism which serves to connect this storage tube to a second storage tube leading to the proper transmitter. The size of the storage tubes are large enough to permit the larger marking balls to freely move therein but are small enough to prevent the smaller spacing balls from passing one another or jamming in the tube. The storage and supply tubes may be of transparent material and the marking and spacing balls different colors to permit normal reading and checking of the balls therein. As the spacing and marking balls pass out through the transmitter they are reconverted back into corresponding signal impulses which are thereupon retransmitted to another station. The balls on leaving the transmitter may or may not be separated into their respective groups and if not they then pass to a common elevator which elevates them to their reservoirs where they are separated and stored ready to be reused again. If the balls are separated on leaving the transmitter each group passes to its associated elevator and is elevated directly to the supply hoppers.

In the embodiments of the invention shown and hereinafter described in detail the movement of the balls from a supply hopper through the various elements of the system is accomplished by gravity as the successive units are preferably on progressively lower levels. However, it should be kept in mind that by employing means such as compressed air, magnetism or other force to move the balls the location of the various units on successively lower levels is not necessary.

The above type of system may be called a single tube system as the spacing and marking balls in a single storing tube represent consecutive impulses of a signal group as contrasted to a multiple group system which may employ as many storage tubes as there are signalling impulses in a single code group or multiples thereof. In a multiple tube system a first storage tube will store all the balls representing the first impulses of each code group, a second tube will store those representing the second impulses, and so on, and in a five unit code there will be five, ten, fifteen or more storage tubes. The storage tubes of either system may be curved into spirals or helices etc. in order to increase their storage capacity and still keep the selector and transmitter as near together as possible. Other tubes may be employed in conjunction with the storage tubes to "side track" elements that for some reason or other are being held for the time being or to give a following group or groups of elements preference to the transmitter over the group or groups that are "side tracked."

Although different selectors and transmitters are shown and hereinafter described as operating in conjunction with single and multiple tube systems it should be kept in mind that with modifications either of the selectors and transmitters may operate in conjunction with either system.

A more thorough and complete understanding of the invention and some of the modifications it may take may be had from the following detailed description and drawings in the latter of which:

Fig. 5 is a plan view of a single tube selector operable in conjunction with start-stop signals;

Fig. 5A is an enlarged view of some of the elements of Fig. 5;

Fig. 6 is an elevational view partly in section of the selector of Fig. 5;

Fig. 7 is a section view taken on line 7—7 of Fig. 5;

Fig. 8 is a view showing some of the elements of Fig. 7 in an operated position;

Fig. 9 is a plan view of a single tube transmitter;

Fig. 10 is an elevational view partly in section of the transmitter of Fig. 9;

Fig. 11 is an enlarged sectional view taken on line 11—11 of Fig. 9;

Fig. 12 is a sectional view taken on line 12—12 of Fig. 11;

Fig. 13 is a partial sectional view taken on line 13—13 of Fig. 9;

Fig. 14 is a sectional view taken on line 14—14 of Fig. 10;

Fig. 15 is a diagrammatic view showing the electrical connections and control circuits of the transmitter shown in Figs. 9 to 14;

Figs. 21 and 22 are elevational views of the multiple tube selector of Fig. 18 showing operated positions of the elements thereof;

Fig. 23 is a diagrammatic view of the distributor and elements associated with the transmitter shown in Figs. 18 to 22;

Fig. 24 is an elevational view partly in section of an elevator;

Fig. 25 is a plan view of the elevator of Fig. 24;

Fig. 26 is a sectional view taken on line 26—26 of Fig. 24;

Fig. 27 is a view partly in section of a separator operating in conjunction with the elevator;

Fig. 28 is a plan view of the separator of Fig. 27; and

Fig. 29 is a sectional view taken on line 29—29 of Fig. 28.

Figure 1:
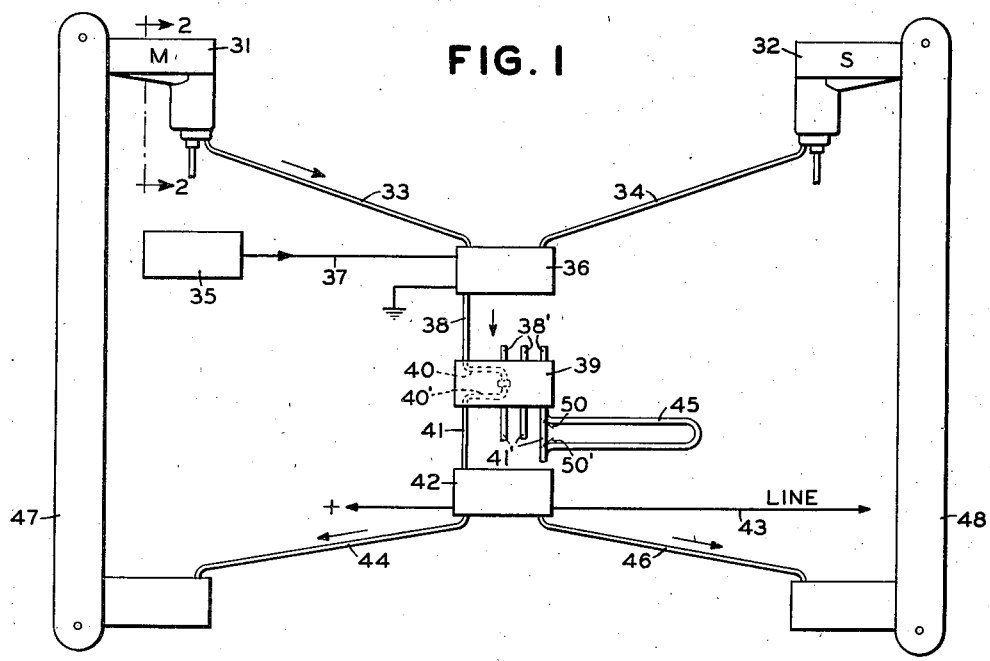
Fig. 1 is a diagrammatic view of the elements employed and the arrangement thereof in a single tube system.

Referring first to Fig. 1 which diagrammatically illustrates the arrangement of the elements of the system embodying the principles of the invention and shows the sequence in which the balls encounter the various units. A supply of marking balls are stored in a hopper or reservoir 31 and the spacing balls in a similar hopper 32. Two supply tubes 33 and 34 are shown connecting the hoppers 31 and 32 respectively to a selector represented by reference numeral 36 and signals received over an incoming line 37 from some source 35 such as a keyboard, transmitter, etc. in a distant or the same office control the operation of the selector 36 so that it puts marking and spacing balls in a storage tube 38 connected thereto in accordance with the received signals. The storage tube 38 is preferably of sufficient length to store the balls representing one or more complete messages therein and terminates in a distributor represented by reference numeral 39. Other storage tubes such as 38' from other selectors like 36 may also terminate at the distributor 39, but for the sake of simplicity of the drawing, only the one selector 36 is shown. Extending from the distributor 39 is a secondary storage tube such as 41 which terminates in a transmitter represented by reference numeral 42. There may also be a plurality of secondary storage tubes such as 41' extending from the distributor 39 to various other transmitters such as 42. The distributor 39 in the preferred embodiment thereof comprises an upper and a lower distributor arm 40 and 40' respectively which are independently rotatable about a common center by automatic and/or manual means. The arms 40 and 40' allow the various kinds of balls to flow or pass therethrough while at the same time keeping them in alignment and permits a path to be established for the balls from any one of the storage tubes such as 38 or 38' to any one of the secondary storage tubes 41 or 41'. A pilot transmitter which may be of the general type hereinafter described may be associated with each of the first storage tubes 38 and 38' or with the arms 40 and 40' of the distributor to determine the destination of the message represented by the balls in the storage tube. Thus the operator is informed where to place the second arm 40' of the distributor. The movement of the second arm 40' of the distributor may be controlled automatically from the first few groups of balls in one of the storage tubes in conjunction with the pilot transmitter. After the arms 40 and 40' of the distributor 39 are properly positioned to distribute the balls from a first storage tube to one of the secondary storage tubes a release is operated to permit the balls to pass therethrough. This distributing or transfer operation of the balls from a first to a secondary storage tube preferably occurs after the receipt of a complete message and in a short interval of time so as to release the distributor for other transfer operations. Obviously the pilot transmitter arrangement located preferably adjacent the ends of the first storage tubes 38 and 38' or associated with the arms 40 and 40' of the distributor are adapted not to change the arrangement of lineup of the balls as the same arrangement should be maintained for subsequent passage through a transmitter such as 42.

Each of the secondary storage tubes 41 and 41' preferably have so-called side-track storage tubes such as 45 connected or associated therewith. By means of the side-track tubes 45 and control valves or gates 50 and 50' located at the entrance and exit of the side-track tubes respectively a message group or groups of balls entering one of the secondary storage tubes may be stored in the side-track tube. This permits following message groups of balls to have preference to the transmitter 42 if for some reason one or more of the following groups of balls are of an urgent character. In this way the order of passage of the various message groups of balls through a transmitter such as 42 may be different from the order in which they are received. As the marking and spacing balls reach the transmitter 42 through the secondary storage tube 41, they are reconverted back into corresponding line impulses which are transmitted over the outgoing line or circuit 43. During the transmitting operation, or immediately following, the transmitter 42 may also separate the marking and spacing balls whereupon they are conveyed by tubes 44 and 46 respectively to associated marking and spacing elevators represented at 47 and 48 respectively. The elevators take the used marking and spacing balls and elevate them to their respective supply hoppers 31 and 32 whereupon they are ready to be reused.

Figure 2:
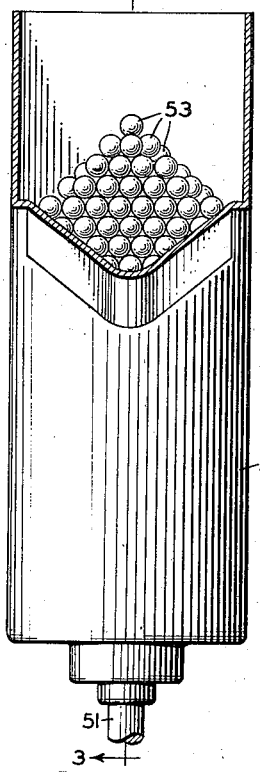
Fig. 2 is an elevational sectional view taken on line 2—2 of Fig. 1.
Figure 3:
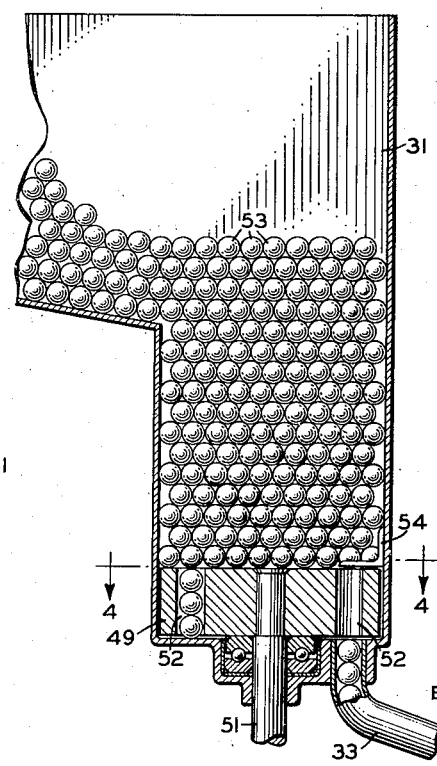
Fig. 3 is a sectional view taken on line 3—3 of Fig. 2.
Figure 4:
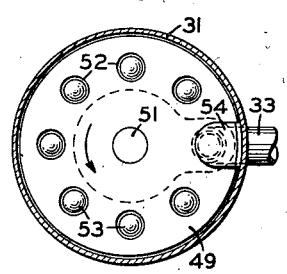
Fig. 4 is a section view taken on line 4—4 of Fig. 3.

Small balls such as those employed in this invention will not flow freely like water from a reservoir into a tube, but are subject to jamming at the mouth of the tube and it is therefore necessary to employ some sort of a stirrer, agitator or mixer in order to keep the supply tubes such as 33 and 34 full of balls. In the preferred embodiment of the invention, the sides and bottom of the hoppers are sloped toward one end which has in the lower portion thereof a circular section. At the bottom of the circular section of a supply hopper such as 31, Figs. 2, 3 and 4, is a disc 49 which is fixed for rotation therewith to a vertical shaft 51 suitably journaled in the bottom of the hopper 31. Formed in the disc 49 are a series of vertical holes such as 52 slightly larger than the balls 53 and parallel with the axis of the shaft 51. The thickness of the disc 49 may be equal to one or more times the diameter of one of the associated balls 53. Connected to the hopper 31 underneath the disc 49 and at the same radius from the center of the disc 49 as the holes 52 is a supply tube 33. As the disc 49 is moved by means not shown, the balls are agitated and fall in the holes 52 to fill the same which then carries them over the tube 33. When one of the holes 52 in the disc line up with the tube 33 the balls therein drop into the tube if the tube is not already full of balls. A lug 54 on the inside of the hopper 31 above the disc 49 and in line with the tube 33 keeps the balls 53 from going directly through the disc 49 into the tube 33 and prevents the possibility of their jamming while the balls carried in the disc are being discharged. The disc 49 may be rotated constantly or stepped and even may be oscillated and obviously more than one supply tube may be connected to a single hopper. Thus the balls 53 from a hopper 31 are lined up in a supply tube such as 33.

Referring now to Figs. 5 to 8, the operation and construction of a so-called single tube selector such as might be represented by reference numeral 36 of Fig. 1 operating in response to signals of the simplex type will now be described. This type of selector is called a single tube selector since it selects the marking and spacing balls and places them one behind the other in a single tube in the same sequence in which the signals are received. As well known in the art the generally employed simplex or start-stop type signals are composed of groups of permutations of a definite number, usually five, of marking and spacing character selecting line conditions which are invariably preceded by a start impulse of one line condition and followed by a stop or rest impulse of another line condition opposite to the start impulse. In order to increase the capacity of a storage tube, balls representing spacing and marking start and rest impulses, respectively, are preferably not placed in a storage tube as each start and each rest impulse is always the same, consequently with balls representing only character selecting line conditions the character storage capacity for a storage tube of a given length is greater than it would be with balls therein representing the start and stop impulses. When the groups of balls in a storage tube are retransmitted over a simplex line the start and rest impulses are automatically inserted into each group of signals as will be hereinafter described. However, the selectors and transmitters could be easily and obviously modified if for some reason it was desired to have balls in the storage tubes to represent the start and rest impulses accompanying each group of balls representing a code group of impulses.

The elements of the selector are mounted on a horizontal plate 56 and attached to the plate by a screw 57 is a signal responsive selector magnet 58 which normally is maintained in an energized position by the closed line condition of the marking rest impulse. Suitably journaled in the plate 56 is a vertical shaft 59, which is constantly driven by means not shown, at such a speed as to make one revolution in the time required to receive one character. Pinned to the shaft 59 for rotation therewith are two collars 61 and 62 and loosely mounted on the shaft between the two collars is a selecting unit cam sleeve referred to in general by reference numeral 63. The selecting unit cam sleeve 63 comprises a stop arm 64 and a disc cam 66 pinned together intermediate with spaces such as 67. The bottom of the selector unit cam sleeve 63 rests on a friction element 68, such as a felt disc and at the top of the selector unit is another friction element 69. Above the friction element 69 loose on the shaft 59 is a collar 71 which is operatively engaged with the collar 62 by means of interengaging tongues and grooves 72. A compression spring 73 surrounding the tongues and grooves 72 presses the collar 71 against the friction element 69 and through the action of the friction elements 68 and 69 the selector unit at all times tends to rotate with the constantly rotating shaft 59.

An armature lever 75 in operative relation with the selector magnet 58 is pivotally mounted on a stud 76 extending vertically from the plate 56. A spring 90 attached to the armature lever 75 tends to pivot the same in a counterclockwise direction against the magnetic force of the selector magnet 58. An arm 77 of the armature lever normally has the end thereof engaged with the end of the stop arm 64 and thereby prevents the selector unit cam sleeve 63 from rotating. Pivoted on another stud 78 extending from the plate 56 is a lever 79 which has adjacent the center thereof a cam following projection 81 in operative alignment with the disc cam 66. A spring 82 attached to the lever 79 normally holds the cam follower 81 in contact with the periphery of the disc cam 66. Formed in the movable end of the lever 79 is a slot 83 which engages a pin 84 in one end of a plunger 86. The plunger 86 is guided for linear movement by guides such as 87 secured to the plate 56. The free end of the plunger 86 has a square end 85 and also beveled surfaces 88, the purpose of which will hereinafter be described.

A second arm 89 of the armature lever 75 has extending at substantially a right angle from the free end thereof a flexible member 91, such as a flat clock spring to the end of which is secured a hammer 92. The hammer 92 is in alignment with the plunger 86 and has beveled and flat surfaces 93 and 94 respectively adapted to cooperate with the beveled surfaces 88 and the square end 85 respectively on the plunger 86. Pivotally mounted on screws 96 in the plate 56, are so-called marking and spacing shuttles 97 and 98 respectively. Attached springs 99 normally hold the shuttles 97 and 98 against associated stops 101. The free ends of each of the shuttles 97 and 98 have thereon projections 102, each of which have a flat surface 103 adapted to cooperate with another flat surface 106 on the lower end of the hammer 92. The projections 102 are in alignment with the plunger 86 and have the hammer 92 interposed therebetween.

The thickness of the marking shuttle 97 is substantially equal to that of a marking ball and the thickness of the spacing shuttle 98 is substantially equal to that of a spacing ball, the marking and spacing balls hereinafter referred to by reference numerals 53M and 53S respectively. Each of the shuttles have therein adjacent the free ends a hole which is normally directly beneath the ends of associated supply tubes such as 33 and 34. The holes in the shuttles 97 and 98 are of sufficient size to permit the passage of their respective balls and with the shuttles in their normal position an associated ball from the supply tubes will be in each of these holes. Underneath the shuttles 97 and 98 is the upper end of a Y tube 111, which leads into a storage tube such as 38. The upper ends of the Y tube 111 are out of alignment with the supply tubes 33 and 34 an amount slightly greater than one half the diameter of one of the balls. Therefore, with the shuttles 97 and 98 in their normal positions, movement of the balls therethrough and into the Y tube 111 is prevented.

Shortly after the selector unit 63 is released for rotation with the shaft 59 by the deenergization of the selector magnet 58 in response to a start impulse of a code group, the first one of a series of humps 112 on the disc cam 66 rotates into operative relation with the cam follower 81 on the lever 79. This causes the lever 79 to pivot in a counter-clockwise direction, as shown in Fig. 5 to an operated position as shown by the dot-dash outline thereof and in moving to this position slides the plunger 86 into engagement with the hammer 92. This movement of the plunger 86 occurs shortly after the first variable impulse of a code group has moved the hammer 92 in accordance therewith, and if this impulse happens to be a spacing or open line condition the spring 90 attached to the armature lever will have moved the hammer 92 to its right hand position where it is in alignment with the projection 102 on the spacing shuttle 98. Therefore, as the plunger 86 moves forward it will engage the hammer 92 to push it forward while it in turn engages the projection 102 of the shuttle 98 and pivots it a slight amount in a counterclockwise direction. This pivoting movement of the shuttle 98 is sufficient to carry the spacing ball 53S therein over and into alignment with the upper end of the spacing side of the Y tube 111 as shown in Fig. 8. Thereupon the spacing ball 53S drops or by the movement of the shuttle 98 is thrown out of the shuttle and into the storage tube 38, the upper end of the Y tube being at an angle to more readily receive the ball. As the hump 112 passes out of operative relation with the cam follower 81 the spring 82 returns the lever 79 and plunger 86 to a normal position. This allows the spring 91 attached to the hammer 92 to move into engagement with its stop 100 and the spring 99 moves the shuttle 98 to its normal position, whereupon another ball from the supply tube 34 drops into the hole in the shuttle. In a similar manner the marking shuttle 97 is operated in response to marking signals being received on the selector magnet 58 to deposit a marking ball in a storage tube 38. There are five humps 112 on the disc cam 66 and therefore the lever 79 will be operated five times during each revolution of the selector unit 63. The lever 79 on each operation thereof in turn operates or causes to be operated either one or the other of the shuttles 97 or 98 and therefore there will be five balls deposited in the storage tube 38 for each revolution of the selector unit cam sleeve 63. The beveled surfaces 88 on the plunger 86 cooperate with the beveled surfaces 93 on the upper end of the hammer 92 while other beveled surfaces 105 on the lower end of the hammer cooperate with a pin 107 in the plate 56 so that if the hammer should happen to be moving into one or the other of its two operated positions during the time the plunger 86 is moving forward due to adverse line or other conditions affecting the operation of the selector magnet 58, the beveled surfaces will positively position the hammer into one or the other of its positions. When the hammer 92 is properly positioned the flat surface 85 on the plunger 86 is engageable with the flat surface 94 on the hammer and the flat surface 106 on the other end of the hammer is in alignment with either one or the other, but not both, of the flat surfaces 103 on the shuttles 97 and 98. Thus only one of the shuttles can operate at a time and prevents the possibility of two balls, a marking and a spacing, from being deposited in the storage tube 38 in response to a single signal which would be the case if the plunger 86 actuated the hammer 92 when it was not properly positioned and could operate both shuttles 97 and 98 at once. The apex formed by the beveled surfaces 88 on the plunger 86 is slightly out of line with the pin 107 so that if the upper point of the hammer 92 should happen to jam with this apex, the pin 107 would be engageable with the left hand beveled surface 105 on the lower end of the hammer to move it to the right as the hammer and plunger moved toward the shuttles, this disengaging the upper point with the apex and allowing only one of the shuttles to operate at a time. Similarly the beveled surfaces 93 and 88 cooperate with one another to move the hammer toward the left should the lower end of the hammer happen to catch on the pin 107. Thus for any position of the hammer 92 other than its extreme left or right hand positions the beveled surfaces thereon are engageable or in alignment with cooperating surfaces on the plunger 86 or the pin 107 to cam it into either of its extreme left or right hand positions.

Although the selector shown in Figs. 5 to 8 has been described as operating in response to signals comprising open and closed line conditions it is obvious that a polar magnet could be substituted for the magnet 58 and the selector operated in response to polar signals. With a polar magnet having a neutral position and the addition of another shuttle such as 97 or 98 for releasing a third size of ball, the selector could be operated in response to a three element code, the third size ball being selected when the hammer is in its neutral position.

The marking and spacing balls placed in the storage tube 38 by the above described selector may be conveyed thereby to and through one or more distributors such as that represented at 39, Fig. 1, however for certain conditions the first storage such as 38 may lead directly to a transmitter.

The manner in which a single tube transmitter such as the one represented by reference 42 of Fig. 1, operates to remove the marking and spacing balls from a storage tube 41 and reconverts them back into groups of representative signals and appends to each group start and stop impulses will now be described. The elements of a transmitter of the above type are shown in Figs. 9 to 15 and comprise a horizontal mounting plate 114 which supports and has attached thereto the various elements comprising the transmitter. On the underside of the plate 114 is a bracket 116 which supports a face plate 117 having a solid ring 118 and a segmented ring 119. Suitably journaled in the bracket 116 and extending through the plate 114 is a vertical shaft 121. The shaft 121 is constantly rotated by means not shown at such a speed that it makes one revolution in a time interval equal to that required to transmit two successive groups of impulses. Loosely mounted on the shaft 121 and adapted to be rotated therefrom by friction elements 122 in much the same manner as the selector unit cam sleeve 63, Figs. 5 to 7, is a disc 123 and a stop arm 124. The disc 123, Figs. 9 to 15, and stop arm 124 are pinned together and in operative relation with the stop arm 124 is a stop latch 126 controlled by a start magnet 127. A spring 128 attached to the stop latch 126 normally holds the free end thereof in engagement with an end of the stop arm 124 and prevents the stop arm and disc 123 from rotating. There are two arms on the stop arm 124 diametrically opposed from one another and insulatively attached to one of the arms by screws 129 is a plate 131 which has brushes 132 in operative alignment with the rings 118 and 119 of the face plate 117.

Attached to the top of the plate 114 by screws 133 is a bracket 134 which holds the lower end of the storage tube 41 to support it in fixed relation to the plate 114. Another bracket 135 is attached to the plate 114 and carries a vertical pin 136 on which is pivotally mounted a lever 137. Extending from the free end of the lever 137 is a follower 139 in operative alignment and with a notched disc 141 attached for rotation therewith to the shaft 121. Also attached to the lever 137 adjacent the center thereof is a small insulating member 146 adapted to enter a hole 145 in the side of the storage tube 41. The other end of the insulating member 146 operates a spring contact 142 in a manner hereinafter described. The disc 123 is located on the shaft 121 just a slight amount above the plate 114 and formed in the disc are two groups of five holes 147, which are all an equal distance from the center of the disc and the holes of each group an equal distance apart. Also formed in the upper side of the disc 123 at the same radius as the holes 147 is a circular groove 148 which extends approximately one half the depth of the disc. Attached to the upper side of the disc 123 are two projections 149 which are diametrically opposite one another and in the stop position of the disc one of these projections 149 is in engagement with an insulating member 151 attached to the tongue 152 of a transmitting contact indicated generally by reference numeral 150. By means of the projection 149 the tongue 152 is normally held in contact with its upper contact spring 153. Another insulating member 154 on the tongue 152 is adapted to follow in the groove 148 in the disc as the disc rotates as hereinafter described. The electrical circuits of the transmitter are as follows: the tongue 152, Fig. 15, of the transmitting contact 150 is connected by a conductor 156 to all of the segments of the segmented ring 119 of the face plate 117. The upper stop 153 of the transmitting contact 150 is connected by a conductor 157 through a coil 158 of a polar line relay 159 to ground and the lower stop 161 of the transmitting contact is connected by conductor 162 through another coil 163 of the line relay to ground. The left hand contact of the line relay 159 is connected to battery and the tongue normally in engagement therewith is connected to the line. Battery is applied to the movable element of contact 142 and the other element thereof is connected by conductor 164 through the coil of a slow making relay 166 to ground. The tongue of the slow making relay 166 is grounded and the make stop associated therewith is connected by conductor 167 through the coil of the start magnet 127 to battery which is also connected by conductor 168 to the solid ring 118.

The operation of the transmitter will now be described and first let it be assumed that there are no balls in the lower end of the storage tube 41. For this condition, the constantly rotating disc cam 141 engages the projection 139 and vibrates the lever 137 at a comparatively high rate of speed against the spring action of the movable element of the contact 142. This causes the insulating member 146 to vibrate in and out of the hole 145 in the side of the storage tube 41 and the contact 142 to rapidly open and close. With no balls in the storage tube 41 there is nothing to hinder the movement of the insulating member 146 into the hole 145 in the side of the storage tube, and therefore for this condition the contact 142 is opened for each vibration of the lever 137. With the contact 142 continually opening, the relay 166 will not become operated as it is a slow making relay and the circuit to the start magnet 127 will not be completed. Therefore the stop latch 126 will remain in an unoperated position and keep the stop arm 124 and disc 123 from rotating with the shaft 121.

Now let it be assumed that marking and spacing balls 53m and 53s, respectively, appear in the lower end of the storage tube 41. As the first one of these balls pass the hole 145 in the side of the tube, the vibrating insulating member 146 may come in contact therewith whereupon its normal movement will be blocked. With the movement of the insulating member 146 blocked, the contact 142 remains closed. The relay 166 being slow to make requires that the contact 142 remain closed for an interval equal to several vibrations of the lever 137 before it operates. However, as others of the balls continue to fall in the tube 41, one or more of the others may also block the movement of the insulating member 146 and maintain the contact 142 in a closed condition whereupon the relay 166 will become operated. With five or more balls in the lower end of the storage tube the contact 142 will remain closed on every vibration of the lever 137 and maintain the relay 166 in an energized condition. When the relay 166 becomes energized it completes the circuit to the start magnet 127 which also becomes energized and withdraws the stop latch 126 from engagement with the end of the stop arm 124 whereupon it and the disc 123 rotate with the shaft 121. As the stop arm 124 rotates, the brush 132 rotating therewith successively applies positive battery from the solid ring 118 to the tongue 152 of the contact 150. With the brush 132 in either of its normal rest positions, battery is applied to the tongue 152 and with the disc 123 in a normal rest position the tongue is held in contact with the stop 153 by one of the projections 149. The stop 153 being connected to the coil 158 of the line relay 159 completes the circuit through this coil and holds the tongue on its left hand contact. The left hand contact is connected to battery, and therefore with the disc 132 and stop arm 124 in a normal position, a closed line or marking condition is transmitted.

With the disc 123 in a normal rest position, the first one of a group of holes 147 therein is directly beneath the lower end of the storage tube 41, and as the balls drop into the tube the first one drops into the first one of these holes. As the disc 123 rotates, it being released as hereinbefore described, the others of the holes 147 successively pass beneath the lower end of the storage tube 41 and have a ball deposited therein. After the disc 123 has rotated a small amount from a rest position the first ball therein encounters an elongated hole or slot 171 in the plate 114. This hole 171 is large enough to permit passage of the small spacing balls 53s therethrough but small enough to prevent the larger marking balls 53m from passing therethrough. Therefore, as the disc 123 rotates, all the small spacing balls 53s in the holes 147 therein drop out of the disc and into the hole 171 which leads to a discharge tube 46 while the larger marking balls 53m remain in the disc 123. After the marking balls 53m pass out of operative relation with the hole 171 they encounter the insulating member 154 on the tongue 152 of the contact 150 and cause the tongue to move into contact with its upper stop 153. As these balls pass out of operative relation with the insulating member 154, the tongue springs down and makes contact with its lower stop 161 where it remains until it is reengaged with its upper stop 153 by a marking ball 53m or by one of the projections 149 on the disc 123. Some time after the larger marking balls encounter the insulating member 154, the disc rotates sufficient to bring them over a curved slot 172 in the plate 114 which is large enough to permit their passage, whereupon they drop therein and enter the discharge tube 44.

Thus the balls in the storage tube 41 are deposited one after the other in the holes 147 in the disc and are carried around to positions where they drop out, the smaller ones dropping out before they reach the transmitting contacts 150 and the larger ones remaining in the disc until after they operate the contact. The brush 132 contacts the segments of the segmented ring 119 simultaneously with the positioning of one of the holes 147 beneath the insulating member 154 and as the tongue 152 is operated at this time in accordance with a marking or spacing ball, an impulse of current is sent through either the coil 158 or coil 163 of the line relay 159. Currents through the coil 163 move the tongue to the right and obviously opens the line circuit while currents through the coil 158 move the tongue to the left and closes the line circuit. Before any of the holes 147 in the disc 123 are rotated beneath the contact 150, the brush 132 passes off its rest segment onto another segment and at this time the tongue 152 will be in contact with its lower stop 161. Therefore the tongue of the line relay 159 will be moved to the right to transmit a start impulse to the line before the tongue 152 is operated in accordance with the balls in the holes 147. After the disc 123 has made a half a revolution from a rest position the insulating member 151 on the tongue 152 engages the other one of the projections 149 to move the tongue into contact with its upper stop 153 and invariably transmit a rest impulse following each group of variable impulses.

The supply of balls in the storage tube 41 may become exhausted for a time being whereupon the movement of the insulating member 146 into the hole 145 in the tube is not hindered and whereupon the contact 142 is allowed to momentarily open. With the contact 142 open the circuit to the relay 166 is broken which thereupon becomes deenergized and opens the circuit to the start magnet 127, the relay 166 being adapted to become deenergized when the contact 142 is opened but once. The deenergization of the start magnet 127 allows the stop latch 126 to move into the path of the end of the stop arm 124 where it will stop the same when it comes in engagement therewith. The disc 123 is brought to rest with the stop arm 124, and in its rest position one of the projections 149 move the tongue 152 into engagement with its upper stop 153 to transmit the rest impulse.

Thus, groups of five marking and spacing balls in the storage tube 41 are converted back into respective groups of marking and spacing or closed and open line conditions respectively and each group is invariably preceded and followed by a start and rest impulse respectively.

As described and shown the disc 123 has two groups of holes 147 and obviously it could have one or a larger number of groups, it being necessary for different numbers of groups to make the proper alterations to the face plate 117 and stop arm 124 and also in the speed of rotation of the shaft 121 for the same signal frequency.

By making slight obvious changes in the disc 123, such as equally spacing the holes 147 therein, removing the projections 149 and allowing the disc to rotate constantly, signals would be transmitted from a transmitter of the above type that would represent a continuous supply of balls in the storage tube 41.

Figure 16:
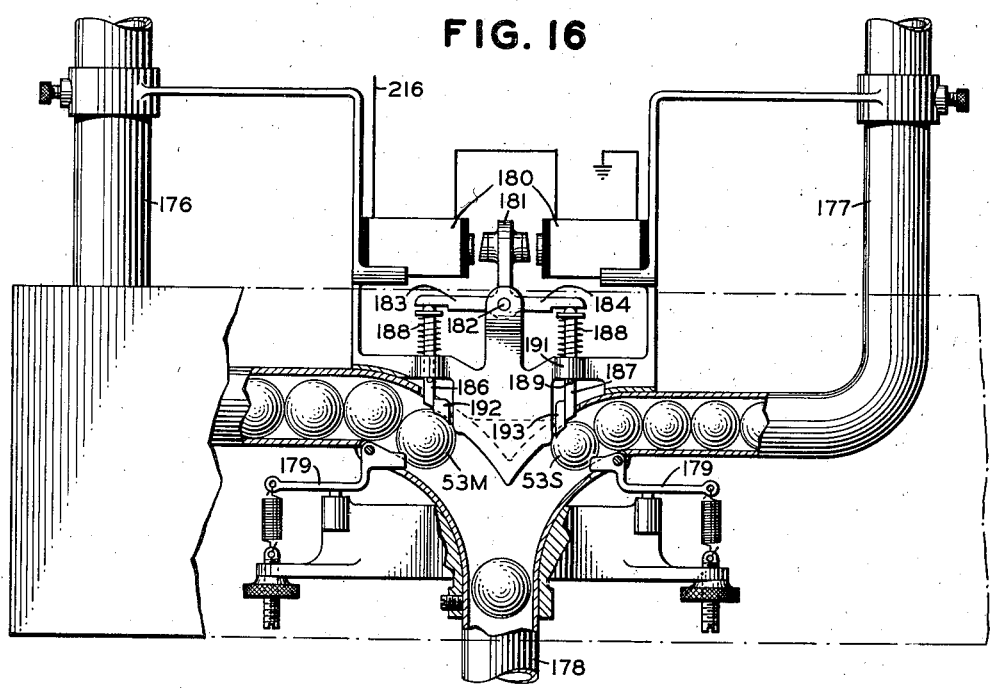
Fig. 16 is a view showing one of the selector elements of a multiple tube selector.

As hereinbefore stated, a so-called multiple tube system differs from a so-called single tube system in that the balls instead of being in single file in a single storage tube such as hereinbefore described are arranged in a plurality of tubes with consecutive balls in a tube representing the same variable impulse of consecutive character groups, such as for example, consecutive balls in a first tube represent the first variable impulse of each consecutive character group and so on for the second, etc. These multiple tube systems are particularly adaptable for use in conjunction with a channel of a multiplex system as each unit has to operate only once for each signal or character group and therefore is capable of functioning more advantageously with the higher speed multiplex signals. Referring to Fig. 16 which shows in detail one unit of a multiple tube selector and Fig. 17 which shows diagrammatically how five of such units are electrically connected to operate in conjunction with and under the control of a multiplex channel, the operation and elements of a multiple tube selector will now be described. Supply tubes 176 and 177 for the marking and spacing balls 53$m$ and 53$s$, respectively, supply the balls to each unit of the selector and each selector unit operates in accordance with received signals to place either one or the other of these balls in a storage tube such as 178. The supply tubes 176 and 177 are substantially vertical and have the lower ends bent horizontally toward one another and converge into a Y at the upper end of the storage tube 178. Spring biased latches 179 located on the underside of the supply tubes just before they converge into the storage tube normally keep the balls from running out of the supply tubes into the storage tube.

The selector operates in response to polar signals and each unit has a polar magnet composed of two individual coils 180 mounted horizontally with the pole pieces facing one another. In between the pole pieces is the vertical arm of an armature lever 181 which is pivotally mounted at 182 in the frame structure. The armature lever also has two horizontal arms 183 and 184, the ends of which are above associated vertical push rods 186 and 187 respectively. Springs 188 on the push rods 186 and 187 normally keep them in their high position as limited by pins 189 engaging the underside of the guide 191. Attached to the lower end of each of the plungers 186 and 187 are hammers 192 and 193, respectively, which are in operative relation with the first ball in each of the supply tubes 176 and 177. The springs 188 normally keep the vertical arm 181 of the armature lever in the center of the pole pieces and if the magnets 180 are energized in such a manner as to pivot the armature lever in a clockwise direction, the arm 184 moves the push rod 187 down and the hammer 193 thereon pushes the first spacing ball 53$s$ over the latch 179 whereupon the ball drops into the storage tube 178. Similarly, when the magnets 180 are energized to pivot the armature lever in a counter-clockwise direction, the arm 183 pushes the push rod 186 down and the hammer 192 pushes the first marking ball 53$m$ past its associated latch 179 and into the storage tube 178. The latches 179 keep the rest of the balls from moving past the hammers 192 and 193 and into the storage tube when the respective hammers are operated. Thus, depending on how the polar magnet is energized either a marking or spacing ball 53$m$ or 53$s$ respectively will be placed in the storage tube 178.

Figure 17:
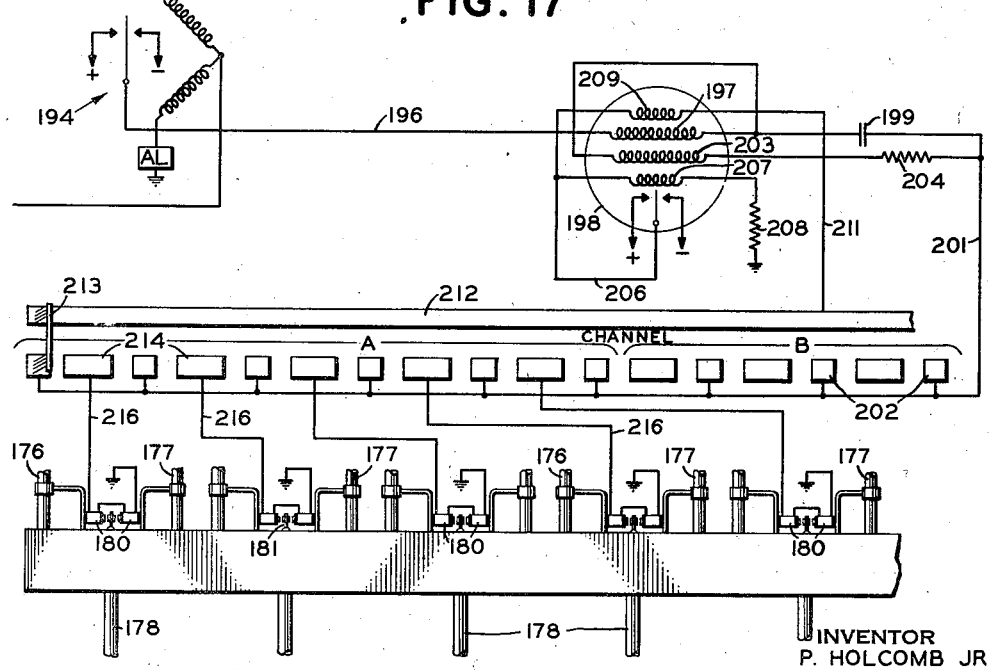
Fig. 17 is a diagrammatic view of the distributor associated with and controlling a multiple tube selector of the type shown in Fig. 16.
Figure 18:
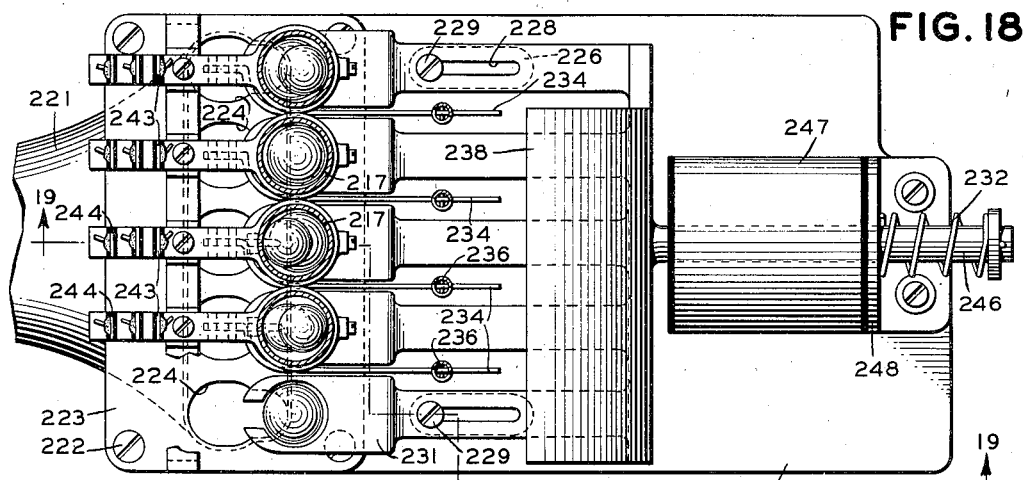
Fig. 18 is a plan view partly in section of a multiple tube transmitter.
Figure 19:
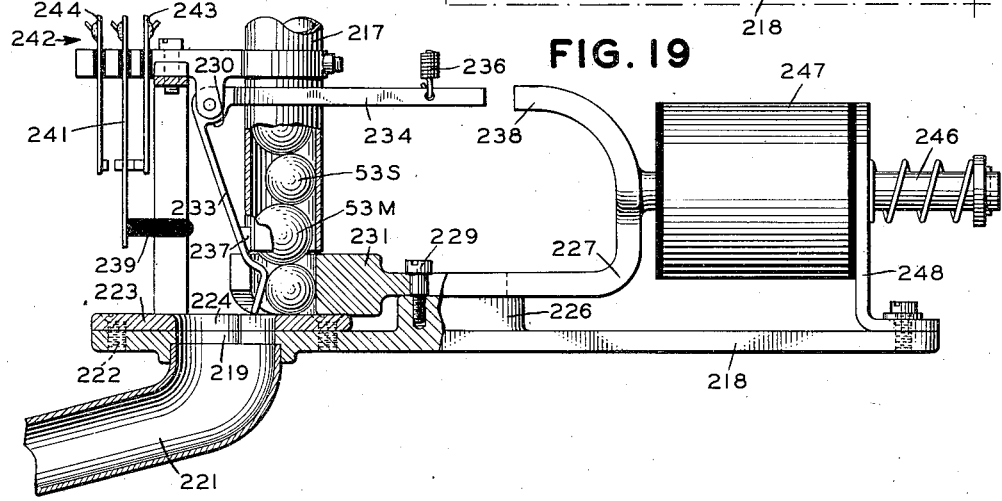
Fig. 19 is a sectional view taken substantially on line 19—19 of Fig. 18.

A preferred manner of connecting the selector units of the above described type to a multiplex channel is shown in Fig. 17 where the tongue of a line relay 194 is connected by a conductor 196 through a coil 197 of a polar relay 198, through a condenser 199 and conductor 201, to alternate segments, such as 202, of a ring of a multiplex face plate. The condenser 199 is in parallel with another coil 203 of the relay 198 and a resistance 204 and the tongue of the relay 198 is connected by a conductor 206 through a coil 207 of the relay, through a resistance 208 to ground in parallel with another coil 209 over conductor 211 to the solid ring 212 of the multiplex face plate. A brush 213 is adapted to bridge the solid ring 212 with the segments 202 and also bridge the solid ring with segments such as 214 arranged alternately with the segments 202. If it is assumed that a marking impulse is received on the line relay 194 which in turn by the circuits hereinbefore described caused the tongue of the relay 198 to move to its right hand stop, negative potential is supplied to the solid ring 212. Let it be assumed that this occurs while the brush 213, rotating in synchronism with the received line impulses is contacting the first segment 202 of the segmented ring associated with the A channel. Now when the brush subsequently contacts the first segment 214 of the A channel, the negative potential will be applied over a conductor such as 216, to the first unit of the selector and operate the selector in the manner hereinbefore described to place a corresponding marking ball in the storage tube 178. Similarly, if a spacing impulse is next received on the line relay 194 to move the tongue of the relay 198 to its left hand contact, positive potential will be applied to the next segment 202 when the brush 213 contacts it. Therefore, when the brush contacts the second segment 214 of the A channel, positive potential from the solid ring 212 will be applied over a second conductor 216 to the second unit of the selector and operate it to place a spacing ball in its associated storage tube. In a similar manner the other units of the selector operate to place either marking or spacing balls in their associated storage tubes as the brush contacts their associated segments 214 of the segmented ring. When the brush passes off one of the segments 214, the spring 188 associated with the operated push rod 186 or 187 returns the armature lever to its normal position where it is in a position to be again operated to select either a marking or spacing ball in the manner described.

A cut-off relay may be employed in a manner well known in the art to function in some manner such as to open the circuit to the solid ring 212 to prevent a series of balls of the same type from being placed in the storage tubes 178 when no message signals are being received or the channel becomes idle.

The storage tubes 178 Fig. 17 may be connected through a distributor such as represented by reference number 39 in Fig. 1 to an equal number of secondary storage tubes such as 217 Figs. 18 to 23. This connecting operation through the distributor quickly discharges the marking and spacing balls in the storage tubes 178 into the secondary storage tubes 217. The tubes 217 terminate in a transmitter of a multiple tube type which transfers the marking and spacing balls back into representative telegraph signals. The transmitter shown connected to the storage tubes 217 Figs. 18 to 23 is adapted to arrange telegraph signals so that they may be transmitted over a multiplex channel but it should be kept in mind however that the transmitter could be adapted to transmit telegraph signals of the simplex or various other varieties.

The hereinafter described multiple tube transmitter comprises a horizontal base plate 218 upon which is mounted the various elements of the transmitter. At the left hand end of the plate 218 is an elongated opening 219 which is in alignment with the mouth or upper end of a discharge tube 221 fixed to the underside of the plate. Attached by screws such as 222 to the upper surface of the plate 218 is a gauge plate 223 which has a series of gauge holes such as 224 therein directly over the opening 219 in the plate. The gauge holes 224 are smaller at one end than they are at the other, the small end permitting the passage of a small spacing ball 53S therethrough and preventing the passage of the larger marking ball 53M. However, the larger section of the gauge holes 224 are of such a size as to permit the passage of the large marking balls therethrough in a manner hereinafter described. Mounted on bosses such as 226 on the plate 218 is a shuttle indicated in general by reference 227. Slots 228 in the shuttle through which extend shoulder screws 229 guide and limit the movement of the shuttle relative to the plate 218. The shuttle 227 has a series of five leftwardly extending horizontal fingers such as 231 each of which has a vertical recess formed therein normally positioned directly beneath the lower end of an associated one of the storage tubes 217. The shuttle 227 is normally held in its right hand position by an attached spring 232.

The lower ends of the storage tubes 217 are out of alignment, to the right as shown in Figs. 18 to 22, with the small opening in the gauge plate 223 and in between the plate 223 and the lower end of the storage tubes 217 are the fingers 231. Slots in the left hand sides of the fingers 231 permit depending arms 233 of associated bell cranks 230 to normally engage the sides of the balls 53 in the fingers 231. Horizontal arms 234 of the bell cranks have springs 236 attached thereto which tend to pivot the bell cranks in a counter-clockwise direction to hold the arms 234 in engagement with associated stops 237 on the outside of the tubes 217. The right hand ends of the arms 234 are in operative alignment with or in the path of movement of a section 238 on the upper part of the shuttle 227. In operative relation with the left hand side of each of the depending arms 233 of the bell cranks 230 are insulating members 239 fixed to the tongues 241 of a series of five contacts indicated in general by reference number 242. Each contact 242 has a right and left hand stop 243 and 244 respectively and the tongue 241 is normally in contact with its right hand stop 243. Fixed to the right hand end of the shuttle 227 is a cylindrical member 246 which forms the plunger of an associated solenoid 247 supported from a bracket 248 attached to the base 218.

The normal operation of the transmitter with all the storage tubes 217 supplied with balls will now be described. The solenoid 247 is first energized as hereinafter described and starts to slide the shuttle 227 toward the left. As the shuttle 227 starts to move toward the left the recesses in the fingers 231 beneath the ends of the storage tubes 217 push the bottommost ball toward the left. These balls thereupon engage the lower end of the arms 233 of the bell cranks 230 and pivot the same a slight amount in a clockwise direction to some such position as that shown by an actuated bell crank in Fig. 20. This pivoting of the bell cranks 230 removes the ends of all of arms 234 from out of alignment with the section 238 of the shuttle and therefore movement of the shuttle is not stopped at this point. Further movement of the shuttle to some such position as that shown in Fig. 21 then places the balls in the fingers 231 over the small section of the holes 224 in the gauge plate 223 whereupon the small balls that happen to be in the fingers are allowed to drop down into the discharge tube 221. At the time the small balls drop through the small section of the holes 224 in the gauge plate 223 the bell cranks 230 are not pivoted sufficiently for the arm 233 thereof to engage associated insulating members 239 but are pivoted sufficiently so that the arm 234 will not hinder the movement of the section 238 of the shuttle. Therefore, as the small balls drop through the gauge plate 223 the springs 236 pivot the bell cranks 230 associated with the fingers 231 that previously had a small ball therein in a counterclockwise direction until the upper surface of the arm 234 engages the underside of the section 238 of the shuttle 227. As the shuttle 227 continues to move, the bell cranks 230 associated with the fingers 231 with a large marking ball 53M therein are pivoted sufficiently in a clockwise direction to engage the insulating members 239 on the tongues 241 of associated contacts 242. Continued pivoting of the bell crank 230 moves these tongues 241 from out of engagement with their right hand stops 243 and into engagement with their left hand stops 244. At this time the large balls 53M in the fingers 231 are in substantially the position shown in Fig. 22 and over the larger sections of the holes 224 in the gauge plate 223 whereupon they drop through the plate 223 and into the discharge tube 221. This allows the associated bell cranks 230 to pivot in a counterclockwise direction and the tongues 241 associated therewith to leave their left hand stops and make with their right hand stops. Shortly after the larger balls drop through gauge plate 223 the shuttle 227 starts to move in the opposite direction toward the right and as the section 238 clears the ends of the arms 234 of the bell cranks 230 the associated springs 236 pivot them back into their normal position in contact with their stops 237. Further movement of the shuttle toward the right then places the recesses in the fingers 231 beneath the ends of the storage tube 217 whereupon the next horizontal group of balls in the storage tube drop down into the fingers 231 ready to operate the contacts 242 in accordance with their size on the next cycle of operation. In this manner groups of five marking and/or spacing balls are removed from the ends of the storage tubes 217 and control the operation of the contacts 242 in accordance with the size of the balls. The tongues 239 of the contacts 242 remaining in their normal positions when the smaller spacing balls 53S are in associated fingers 231 and are moved to their left hand stop when the larger balls are present. The manner in which the contacts 242 control the transmission of respective marking and spacing signaling impulses of multiplex signals will hereinafter be described.

Figure 20:
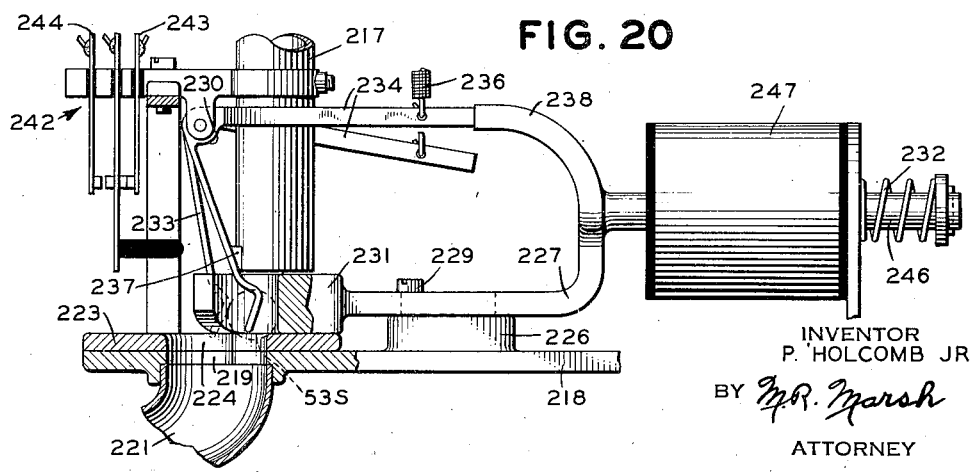
Fig. 20 is a view similar to Fig. 19 showing an operated position of some of the elements thereof.

If for some reason one or more of the supply tubes 217 fail to have balls therein as the shuttle starts to move toward the left it is desirous that the movement of the shuttle be stopped before it is moved an appreciable amount, otherwise part of the balls representing a group of signals would be likely to pass through the transmitter while the others remain in storage tubes. As it is necessary for five balls to pass through the transmitter to transmit a complete signal the passage of any lesser number would adversely affect each group of signals transmitted thereafter. If one or more fingers 231 fail to have a ball therein as the shuttle starts to move toward the left, the bell crank or cranks 230 associated with the empty finger or fingers 231 will not be pivoted. Therefore the end of the arm 234 remains in operative alignment with the section 238 of the shuttle 227 and when the shuttle moves sufficiently for the section 238 to engage the end of the arm 234 further movement of the shuttle toward the left will be blocked. Such a position of the shuttle is shown in Fig. 20 and in this position the movement thereof toward the left is not sufficient to allow the small balls which happen to be in fingers 231 to drop through the small section of the holes 224 in the gauge plate 223. Therefore as the shuttle 227 subsequently moves toward the right back into its normal position the curved ends of the finger 231 engage the balls therein and move them back underneath the ends of the storage tubes 217. If prior to the next movement of the shuttle 227 to the left all the fingers 231 have received a ball, subsequent movement of the shuttle will not be blocked but will slide to its extreme left hand position and deposit the spacing and marking balls carried thereby in the discharge tube 221 while operating the contacts 242 in accordance with the size of the balls as hereinbefore stated. Should one or more of the fingers 231 fail to receive a ball on following cycles of operation of the shuttle, the blocking operation will continue on every cycle of operation thereafter or until the fingers all receive a ball. Thus part of the balls representing a signal group cannot pass through the transmitter to transmit a wrong code combination.

The manner in which the solenoid 247 is operated and the contacts 242 control the transmission of marking and spacing signal impulse will now be described. Referring to Fig. 23, each of the tongues 241 of the contacts 242 are connected by individual conductors, such as 249, through individual coils 251 of a relay band 250 to battery. The right hand stops 243 of the contacts 242 are open and the left hand stops 244 are connected in parallel by a conductor 252 to ground. Tongues 253 of the relay bank 250, associated with the coils 251 are connected by individual conductors such as 254 to consecutive segments of a multiplex face plate ring 256. A solid ring 257 associated with the segmented ring 256 is connected by the conductor 258 to the apex 260. A first brush 259 is associated with the rings 256 and 257 to successively bridge the segments with the solid ring while a second brush 261 rotating therewith bridges a segmented ring 262 with a solid ring 263. A segment 264 of the ring 262 is connected by a conductor 266 through the coils 267 of the relay bank 250 in series to ground. Another segment 268 of the ring 262 is connected by conductor 269 through the coil of the solenoid 247 to ground. Potential is applied to the solid ring 263 and the left and right hand stops associated with the tongues 253 of the relay bank 250 have positive and marking potentials respectively applied thereto.

Let it be assumed that the brushes 259 and 261 are rotating at a constant speed and the brush 261 bridges the segment 264 with the solid ring 263 to apply potential to the coils 267 of the relay bank 250, which throws the tongues 253 thereof to the right into contact with their spacing stops. The tongues 253 in turn apply negative or spacing battery to the segments of the ring 256. The brush 261 next bridging the segment 268 with the solid ring 263 applies potential over conductor 269 to the solenoid 247. This energizes solenoid 247 and provided the fingers 231 of the shuttle 227 each has a ball therein the shuttle will move toward the left and operate the contacts 242 or leave them in their normal position in accordance with the marking and spacing balls respectively in the fingers as hereinbefore described. The tongues 241 of the operated contacts 242 in moving to their left hand stops complete individual circuits from battery at one terminal of associated coils 251 to ground at these left hand stops. The energization of the coils 251 associated with the operated tongues 241 of the contacts 242 cause the tongues 253 in the relay bank 250 to move into contact with their left hand of marking contacts which applies marking potential to respective segments of the ring 256. Now as the brush 259 subsequently bridges the ring 257 with the segments of the ring 256, marking and spacing impulse will be transmitted to the line in accordance with the positions of the tongue 253 of the relay band 250. Thus marking and spacing impulses are transmitted to the line in accordance with the balls passing through the transmitter. After the transmission of each character selecting group of impulses to the line the coils 267 move the tongues 253 in the relay bank 250 to the right to apply spacing potential to the segments of the ring 256 and if during the following energization of the solenoid 247 movement of the shuttle 227 is blocked as hereinbefore described the next group of signals transmitted as the brush 259 contacts the segments of the ring 256 will be an all spacing group. These all spacing groups of impulses will continue to be transmitted as long as the movement of the shuttle 227 to its extreme left hand position is blocked. In this manner marking and spacing balls 53m and 53s in the storage tubes 217 are reconverted back into associated marking and spacing impulses and are transmitted to a multiplex channel.

The shuttle 227 in the above described multiple tube transmitter is shown in Figs. 18 to 23 as being controlled by a solenoid 247 and cooperating with five storage tubes 217, it being necessary for the shuttle therefore to move one ball from each of the tubes to transmit a code group of five multiplex signals. However, the shuttle 227 could be controlled by other means such as a cam operating in time relation with the brushes 259 and 261 and a single shuttle could cooperate with any number of storage tubes, the number preferably being in multiples of five where multiplex signal groups of five impulses each are to be transmitted. The described multiple tube transmitter could also be arranged to operate to transmit signals of the simplex or start-stop type.

The movement of the balls in passing through described selecting and transmitting units and tubes is dependent as described on gravity and therefore as the balls leave a transmitter they are at a lower level than the supply of storage reservoirs and must be elevated to these hoppers in order to be in a position to be used. However, it is obvious that other forces such as mechanical air pressure, etc., may be used to move the selecting elements from one position to another. In a single tube transmitter such as the one described and shown in Figs. 9 to 15, the balls are separated into their associated groups in the transmitter, whereas in the multiple tube transmitter described and shown in Figs. 18 to 23 both marking and spacing balls leave the transmitter in the common discharge tube 221. When the balls are separated into their proper groups as they leave a transmitter two means are employed to elevate the balls to their associated supply hoppers whereas if the balls are not separated until after they are elevated a single elevating means may be employed.

The preferred method of elevating the balls is by an elevator comprising an endless chain with a series of buckets capable of carrying one or more balls fixed to the links of the chain. The buckets carry the balls from one level up to a higher level where they drop into their supply hoppers and the elements of such an elevator shown in Figs. 24 to 29 will now be described.

The discharge tubes from the transmitters such as 221 empty into a discharge hopper 271 where the balls accumulate during the operation of the transmitters. An endless chain 272 with a plurality of buckets 273 fixed to the links thereof is employed to elevate the balls from the discharge hopper 271 to a supply hopper such as 274. The chain 272 engages a sprocket 276 at its lower end which is driven by a source of power such as a motor 277 and the upper end of the chain 272 passes over an idler sprocket 278 at the upper end thereof. As the chain 272 moves, the buckets 273 attached thereto enter through the bottom of the discharge hopper 271 and pass upward through the side of the hopper, suitable openings being formed in the bottom of the hopper and the side to permit the passage of the buckets. A projection 279, Fig. 26, extends into the opening in the bottom of the discharge hopper 271 to prevent the balls from falling out and a slot in the pockets 273 permits the pockets to pass through the opening. As the chain moves, the balls in the buckets 273 are carried up and over the sprocket 278 whereupon they fall into a guideway 281 Fig. 24, which leads to the supply hopper 274. The guideway 281 is constructed similar to the bottom of the discharge hopper 271 so as to permit the passage of the buckets 273 therethrough while preventing the balls from dropping out.

Where one elevator is employed for elevating both the marking and spacing balls, they must be separated before they can be discharged into their respective supply hoppers. Under these conditions an elongated chute or a tube is employed which as shown in Figs. 27 and 28, extends over both the spacing and marking storage hoppers 283 and 284 respectively. The marking and spacing balls on leaving the buckets 273 roll down the chute 282 which has formed in the bottom thereof, over the supply hoppers 283 and 284, elongated slots 286 and 287 respectively. The slot 286 is large enough to permit the smaller spacing balls 53s to pass therethrough, while preventing the larger marking balls 53m from dropping out at this point. The hole 287 is sufficiently large to allow the marking balls 53m to drop out at that point. Thus, as the marking and spacing balls roll down the inclined chute 282, the smaller spacing balls drop through the elongated hole 286 into their associated supply hopper 283, while the larger marking balls continue to roll down the chute 282 and drop through the elongated hole 287 into their associated supply hopper 284. In this manner the marking and spacing balls may be separated into their respective groups and are ready to be selected and again pass through the system. Obviously a chute such as 282 could equally well be employed in the discharge tubes from the type of transmitters that do not separate the balls.

It is obvious that various other modifications of the apparatus shown and described herein may be made without departing from the spirit or the essential attributes of the invention and it is desired, therefore, that only such limitations will be placed thereon as are imposed by the prior art or are specifically set forth in the appended claims.

What is claimed is:

1. In a signal storage telegraph system, a plurality of two different sizes of balls arranged in single file in a confining tube, a sending circuit, means for removing said balls one at a time from said confining tube, and means operative concomitantly with said ball removing means for transmitting to said sending circuit signalling impulses of two different line conditions representative of according to a predetermined arrangement the sizes of balls removed from said confining tube.

2. In a signal storage telegraph system, a plurality of two different sizes of balls arranged in single file in a storage tube, means for successively removing one at a time groups of balls from said tube, means for converting said balls into consecutive telegraph signals of two different line conditions whereby the balls of one size represent the impulses of one line condition and those of the other size represent the impulses of the other line condition and aptomatically operated means for preceding each group of impulses removed from said storage tube with a start impulse of one line condition and following each such group of impulses with a rest impulse of opposite line condition to said start impulse.

3. In a signal storage telegraph system comprising a plurality of marking and spacing balls having different characteristics arranged in single file in a confining tube, said balls representing according to their size marking and spacing impulses, a transmitting circuit, power driven means for removing groups of a definite number of said balls one at a time from said confining tube, means controlled by said balls in or adjacent the discharge point of said tube for releasing said power driven means for operation and means operative during the operation of said power driven means for reconverting the balls removed from said tube into respective marking and spacing impulses and transmitting the same to said sending circuit.

4. In a signal storage telegraph machine, a plurality of marking balls and a plurality of spacing balls, said balls having different size characteristics and arranged in single file in a storage tube, a power driven disc having cavities therein rotatable past the discharge point of said tube to remove said balls one at a time therefrom, a transmitting contact and a transmitting circuit associated therewith, said contact being in operative relation with the cavities in said disc on the rotation thereof, means for removing the smaller of said balls from the cavities of said disc prior to the passage of said cavities past said contact and means for retaining the larger of said balls in said cavities during the passage thereof past said contact to operate the same so as to transmit to said transmitting circuit impulses representative of the marking and spacing balls removed from said storage tube.

5. In a signal storage telegraph machine, a plurality of marking balls of one size and a plurality of spacing balls of another size, said balls being arranged in a storage means which is adapted to retain said balls in the order in which they are placed therein, means for removing said balls from said storage means in the order in which they are placed therein, a sending circuit and means including said last mentioned means for transmitting to said sending circuit permutations of two different line conditions representative of the two different sizes of balls removed from said storage means.

6. In a signal storage telegraph system, a plurality of balls of a plurality of different diameters, a signal responsive means, means controlled by said signal responsive means for selecting balls of different diameters in accordance with the operation thereof, storage means for maintaining said selected balls in the order in which they are selected, a transmitting means and means following said storage means for removing balls therefrom and for operating said transmitting means in accordance with the different diameters of balls in said storage means and in the order of selection to transmit permutation signals of a plurality of different line conditions equal in number to the number of different diameters of said balls.

7. In a signal storage telegraph system, a plurality of marking balls of one type and a plurality of spacing balls of another type, a signal responsive means for selecting said marking and spacing balls in accordance with received signals, a storage means for retaining both types of said selected balls in the order of selection, a transmitting means cooperable with said storage means to remove balls therefrom and means for operating said transmitting means in accordance with the different type of said marking and spacing balls removed from said storage means to transmit marking and spacing impulses representative of said marking and spacing balls, said balls being removed from said storage means in the order selected.

8. In a telegraph machine for transmitting code groups comprising a definite number of character selecting impulses, a plurality of balls of one size and a plurality of balls of another size, a plurality of separate storage means for maintaining both sizes of balls in the order in which they are deposited therein, said storage means being equal in number to the number of character selecting impulses of each code group, means for removing a ball from each of said storage means and means cooperating with said removing means for transmitting a code group of impulses representative of the sizes of balls removed from said storage means.

9. In a telegraph machine for transmitting code groups comprising a definite number of solely character selecting impulses representing permutations of two different line conditions, a plurality of balls of one size and a plurality of balls of another size, a plurality of storage means for maintaining both sizes of balls in the order in which they are deposited therein, said storage means being equal in number to the number of character selecting impulses in each code group, a shuttle for removing a ball from each one of said storage means on each operation thereof, a transmitting means controlled by the balls removed from said storage means by said shuttle to transmit impulses of two different line conditions representing according to a predetermined arrangement the two different sizes of balls removed from said storage means.

10. In a signal storage telegraph system, a plurality of balls of one size and a plurality of balls of another size, a plurality of storage means adapted to maintain both sizes of said balls in the order in which they are placed therein, a transmitting mechanism and means incorporating said transmitting mechanism for removing balls from said storage means and automatically transmitting code groups of impulses of two different line conditions whereby the two different line conditions of the first, second, third, etc. groups represent according to a predetermined arrangement the different sizes of balls removed from the first, second, third, etc. of said storage means.

11. In a cyclically operable telegraphic machine, a plurality of balls of one size and a plurality of balls of another size, a plurality of storage means, a periodically operating member normally operable to remove a group of balls from each of said storage means on each operation thereof, each of said groups of balls comprising the first ball in each of said storage means and means cooperable with said last mentioned means for transmitting code groups of impulses of two different line conditions representing according to a predetermined arrangement the two sizes of balls removed from said storage means.

12. In a signal storage telegraph system, a plurality of mechanical elements of one size and a plurality of mechanical elements of a different size, a plurality of signal responsive devices for selecting one or the other of said sizes of mechanical elements in accordance with received signals, a plurality of storage devices for retaining selected of said mechanical elements and for allowing the same to be removed therefrom in the order in which they are placed therein, a transmitting device, means for moving said mechanical elements in a predetermined order from said storage means through said transmitting device and means operable during such movement of said mechanical elements for transmitting signals representative, according to a predetermined arrangement, the different sizes of said mechanical elements.

13. In a signal storage device, a plurality of mechanical elements of one size and a plurality of mechanical elements of a different size, storage means for confining both sizes of said mechanical elements, means ahead of said storage means and responsive to receive signals of two different line conditions for arranging said mechanical elements in said storage means whereby one line condition is represented by a mechanical element of one size and the other of said line conditions by a mechanical element of another size, means for removing said mechanical elements from said storage means in the same order in which they are placed therein and converting them into signals of two different line conditions whereby one size of mechanical elements are represented by one line condition and the other size by the other line condition.

14. In a signal storage telegraph system, a plurality of balls of one size and a plurality of balls of another size, a reservoir for each of said sizes of balls, supply tubes from each of said reservoirs leading into a common storage tube, means for depositing a predetermined number of balls from said reservoirs into associated supply tubes at a time, signal responsive means in said supply tubes for releasing balls from one or the other of said supply tubes into said storage tube in accordance with the operation thereof, a sending circuit, a transmitting means following said storage means for removing the balls from said storage means and controlled in accordance with the different sizes thereof for transmitting to said sending circuit signals similar to those which operated said signal responsive means, means for separating said balls into their respective sizes concomitantly with the passage thereof through said transmitting means and means for returning said separated balls to their respective reservoirs.

15. In a signal storage telegraph device, storage means, flowable marking and spacing mechanical elements having different characteristics in said storage means, and transmitting means cooperable with the balls of said storage means for generating signals in accordance with the character of said mechanical elements.

16. In a signal storage telegraph system, a plurality of two different sizes of balls arranged in single file in a confining tube, a sending circuit, means for removing said balls one at a time from said confining tube in the same order in which they appear therein and means cooperating with said removing means and controlled by removed balls for successively transmitting to said sending circuit impulses of two different line conditions whereby the balls of one size removed from said tube are represented by impulses of one line condition and balls of the other size removed from said tube are represented by impulses of the other line condition.

17. In a signal storage telegraph system, a plurality of two different sizes of balls arranged in a single file in a storage tube, means for successively removing one at a time groups of balls from said tube, means for converting said balls into consecutive telegraph signals of two different line conditions whereby the balls of one size represent the impulses of one line condition and those of the other size represent the impulses of the other line condition and means for accompanying each group of impulses representing a group of balls with other impulses of predetermined line conditions.

18. In a cyclically operable telegraph machine of the type described, a plurality of marking and spacing balls having different size characteristics, said balls being confined and arranged in single file in a storage tube, means for removing groups of a definite number of said balls one at a time from said storage tube on each cycle of operation and means for preventing the removal of said balls in other than said groups or multiples of said groups.

19. In a telegraph machine of the type described, a plurality of marking and spacing balls having different size characteristics arranged in single file in a storage tube, means for conditioning said balls for removal from said tube, said means moving said balls to a discharge point of said tube or successively into contact or close relation with one another thereat, means for removing groups of a definite number of said balls one at a time from said storage tube, and means for preventing the removal of the first ball of a group until at least a predetermined number of said balls are in condition to be removed.

20. In a signal storage telegraph machine, a plurality of balls of a plurality of different diameters, a storage means for maintaining said balls in the order in which they are placed therein, means for removing said balls from said storage means in a predetermined order, a transmitting means and means controlled by the balls removed from said storage means for operating said transmitting means in accordance with the different diameters of said balls and transmit permutation signals of a plurality of different line conditions equal in number to the number of different diameters of said balls.

21. In a signal storage telegraph system, a plurality of balls of one size and a plurality of balls of another size arranged in single files in a plurality of separate storage means, means for removing a ball from each of said storage means at a time, a transmitting circuit and means controlled in accordance with the different sizes of balls removed from said storage means by said removing means for transmitting to said transmitting circuit permutations of two different line conditions whereby one of the sizes of balls removed from said storage means are represented by one line condition and the other size of said balls are represented by the other of said line conditions.

22. In a telegraph machine for transmitting code groups comprising a definite number of solely character selecting impulses representing permutations of two different line conditions, a plurality of balls of one type and a plurality of balls of another type, a plurality of storage means for maintaining both types of balls in the order in which they are deposited therein, said storage means being equal in number to the number of character selecting impulses in each code group, a cyclically operable member for removing a ball from each one of said storage means on each operation thereof, a distributing means, a sending circuit and means including said distributing means for converting the different types of balls removed from said storage means by said cylically operable member into representative character selecting conditions and thereafter distributing the impulses to said sending circuit.

23. In a telegraph machine for transmitting code groups comprising a definite number of solely character selecting impulses representing permutations of two different line conditions, a plurality of balls of one size and a plurality of balls of another size, a plurality of storage means for maintaining both sizes of balls in the order in which they are deposited therein, means for conditioning said balls for removal from said storage means, said means moving said balls to the discharge point of said storage means, said storage means being equal in number to the number of character selecting impulses in each code group, a periodically operable member for normally removing a ball from each of said storage means on each operation thereof, a transmitting mechanism and means actuated by the balls removed by said periodically operable member for controlling the operation of said transmitting mechanism to transmit code groups of impulses representative of the different sizes of balls.

24. In a signal storage telegraph system, a plurality of balls of one size and a plurality of balls of another size, a plurality of storage means adapted to maintain both sizes of said balls in the order in which they are placed therein, means for reviewing the balls in said storage means, a transmitting mechanism controlled by said reviewing means and means incorporating said transmitting mechanism for transmitting code groups having impulses of two different line conditions with each group being equal in number to the number of said storage means whereby the first, second, third, etc. impulses of each group represent according to a predetermined arrangement the different sizes of balls in the first, second, third, etc. of said storage means.

25. In a telegraph machine, a plurality of balls of one size and a plurality of balls of another size, a plurality of storage means for maintaining said balls in the order in which they are placed therein, a transmitting means, a cyclically operated member for moving a ball from each of said storage means through said transmitting means upon each operation thereof to transmit permutations of two different line conditions in accordance with the sizes of balls moved through said transmitter and means for preventing the passage through said transmitting means of any number of balls less than the number of storage means upon an operation of said cyclically operable member.

26. In a signal storage telegraph system, a plurality of mechanical elements of one size and a plurality of mechanical elements of another size, a plurality of separate storage means for maintaining said mechanical elements in the order in which they are placed therein, means for conditioning the mechanical elements in each of said storage means for removal therefrom by moving the same to the discharge points thereof, a sending circuit, a cyclically operable transmitting mechanism normally operating to remove a group of mechanical elements from said storage means and transmit to said sending circuit, a group of code combinations of impulses corresponding to the different sizes of said mechanical elements on each cycle of operation thereof, each of said groups of mechanical elements comprising one from each of said storage means and each of said code groups comprising a number of impulses equal to the number of said storage means and means for preventing the normal cycle of operation of said transmitting means whenever mechanical elements are not conditioned for removal from one or more of said storage means.

27. In a signal storage telegraph system, a plurality of mechanical elements of one size and a plurality of mechanical elements of another size, a plurality of separate storage means for maintaining said mechanical elements in the order in which they are placed therein, means for conditioning the mechanical elements in each of said storage means for removal therefrom by moving the same to the discharge points thereof, a sending circuit, a cyclically operable transmitting mechanism normally operating to remove a group of mechanical elements from said storage means and transmit to said sending circuit a group of code combinations of impulses corresponding to the different sizes of said mechanical elements on each cycle of operation thereof, each of said groups of mechanical elements comprising one from each of said storage means and each of said code groups comprising a number of impulses equal to the number of said storage means, means for preventing the normal cycle of operation of said transmitting means whenever a mechanical element is not conditioned for removal from one or more of said storage means and means operative during off-normal cycles of operation of said transmitting mechanism for transmitting to said sending circuit a code group of impulses of predetermined character.

28. In a signal storage telegraph system, a plurality of two different kinds of balls arranged in single file in a confining tube, a sending circuit, means for removing said balls one at a time from said confining tube, and means controlled by the balls removed by said removing means for transmitting to said sending circuit signaling impulses of two different line conditions representing according to a predetermined arrangement the kinds of balls removed from said confining tube and in the same order.

29. In a signal storage telegraph system, a plurality of two different kinds of balls arranged in single file in a confining tube, a sending circuit, means for removing said balls from said confining tube in the same order in which they appear therein and means controlled in accordance with the different kinds of balls removed from said confining tube by said removing means for successively transmitting to said sending circuit impulses of two different line conditions whereby the balls of one kind removed from said tube are represented by impulses of one line condition and balls of the other kind removed from said tube are represented by impulses of the other line condition.

PHILO HOLCOMB, Jr.